E. JUNGHANNS.
DUMP CAR.
APPLICATION FILED MAR. 4, 1918.
1,305,118.
Patented May 27, 1919.
8 SHEETS—SHEET 7.
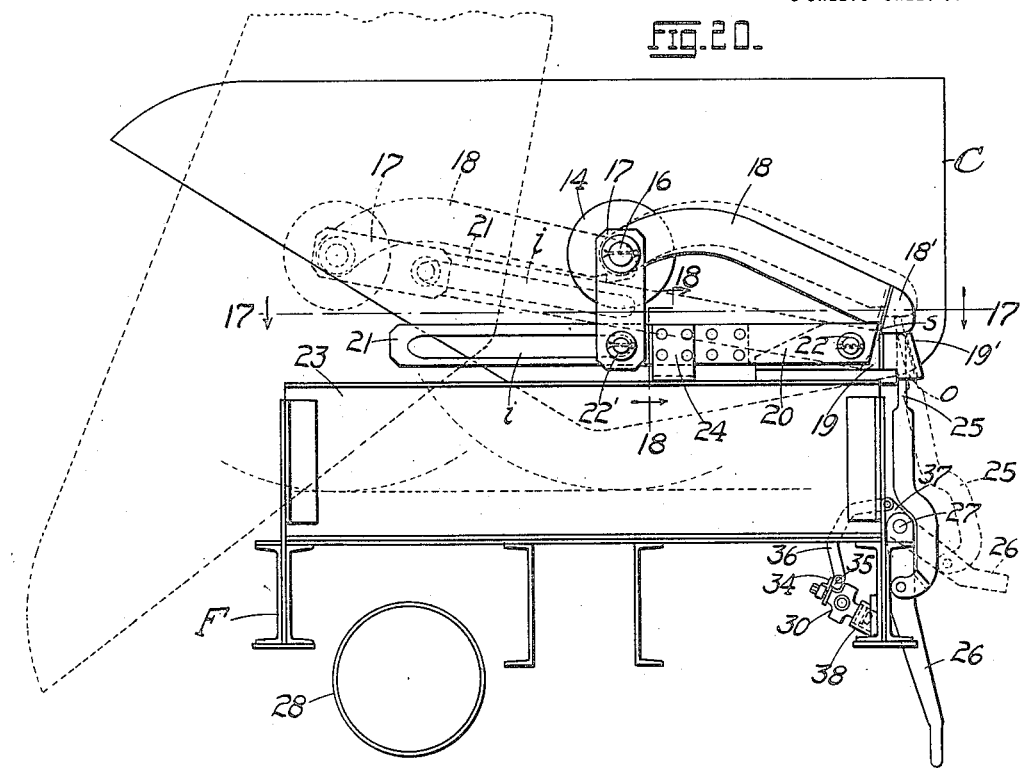
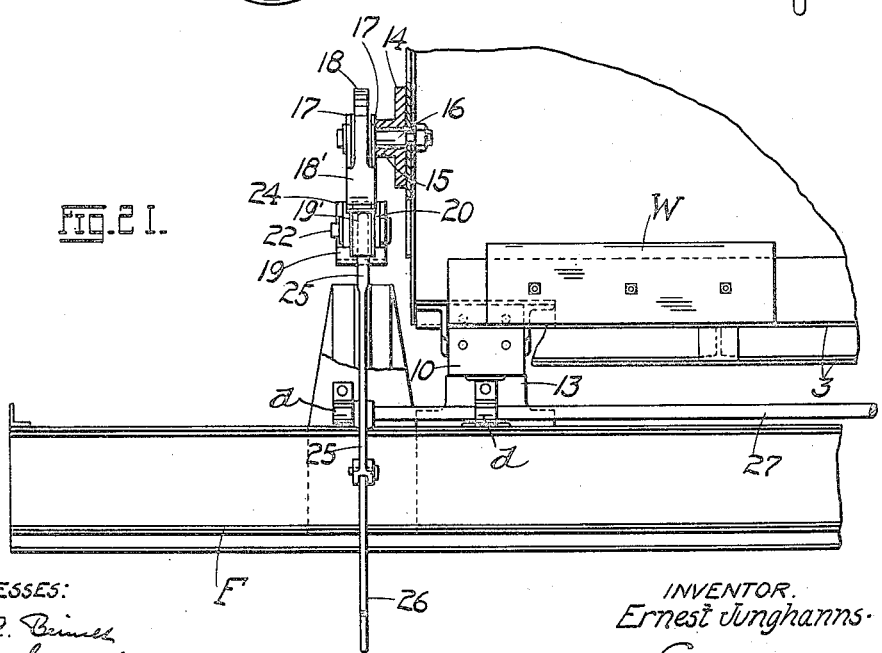
WITNESSES:
Harry A. Brines
Else M. Siegel
INVENTOR.
Ernest Junghanns.
BY Emil Starer
ATTORNEY.

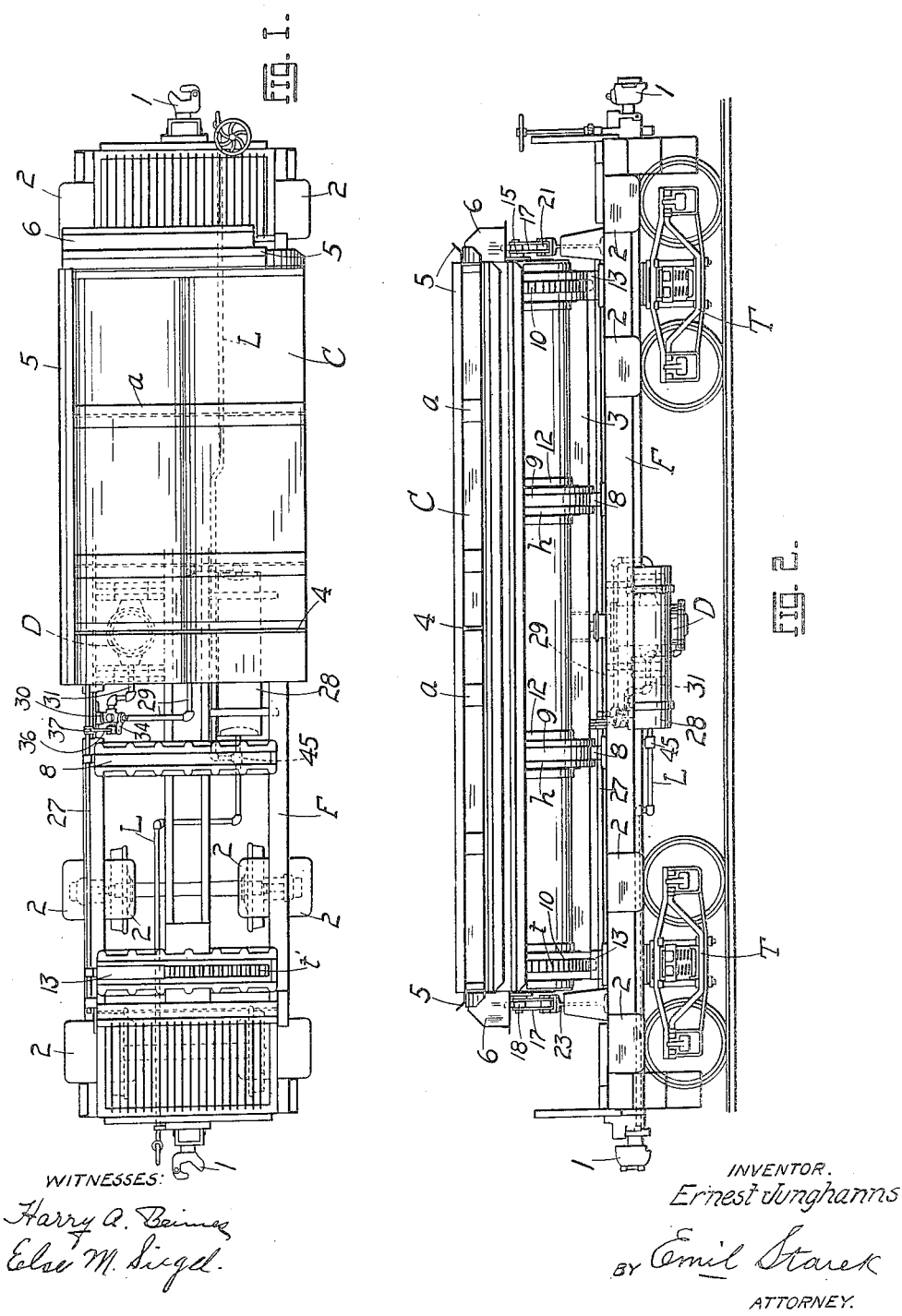

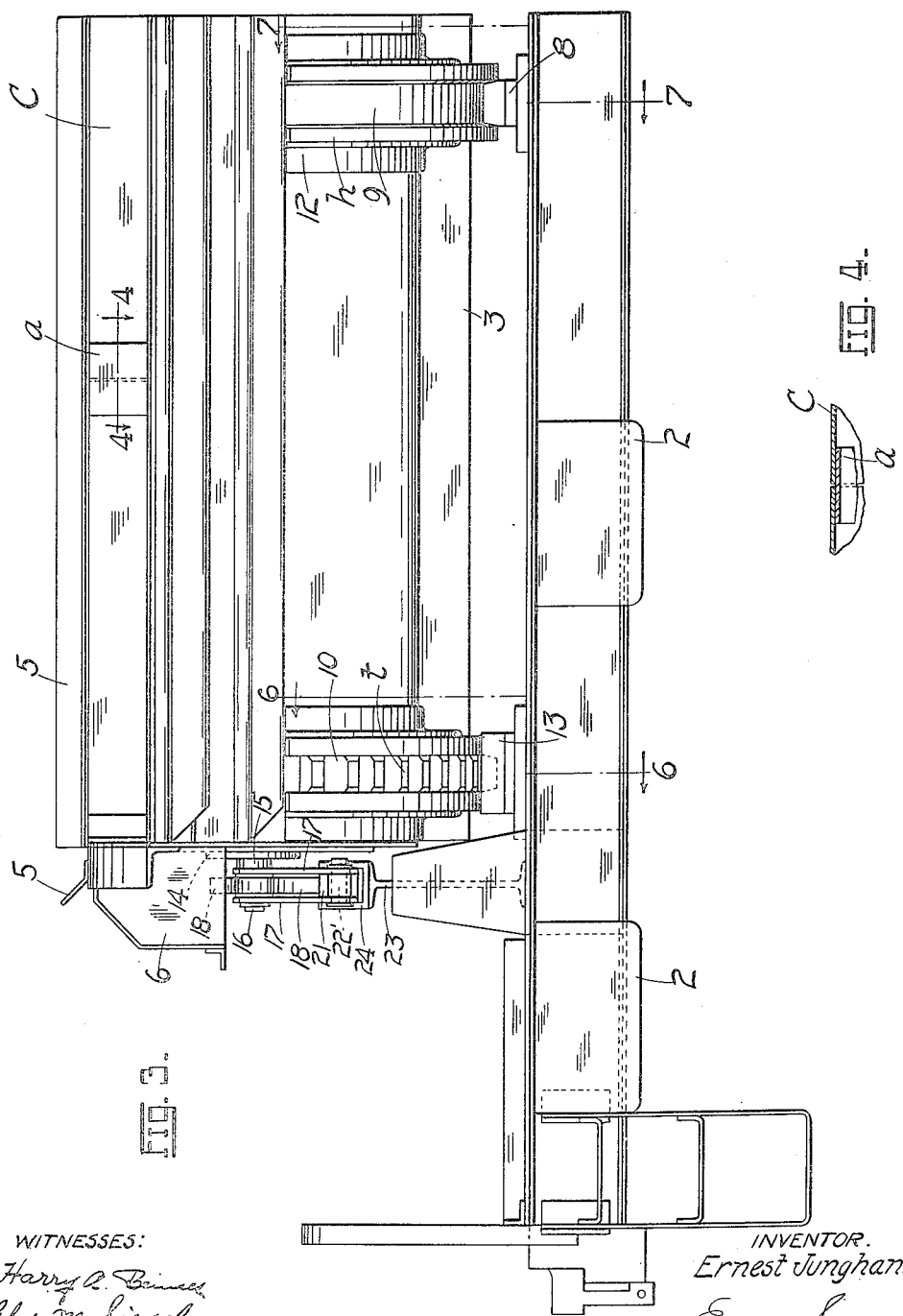

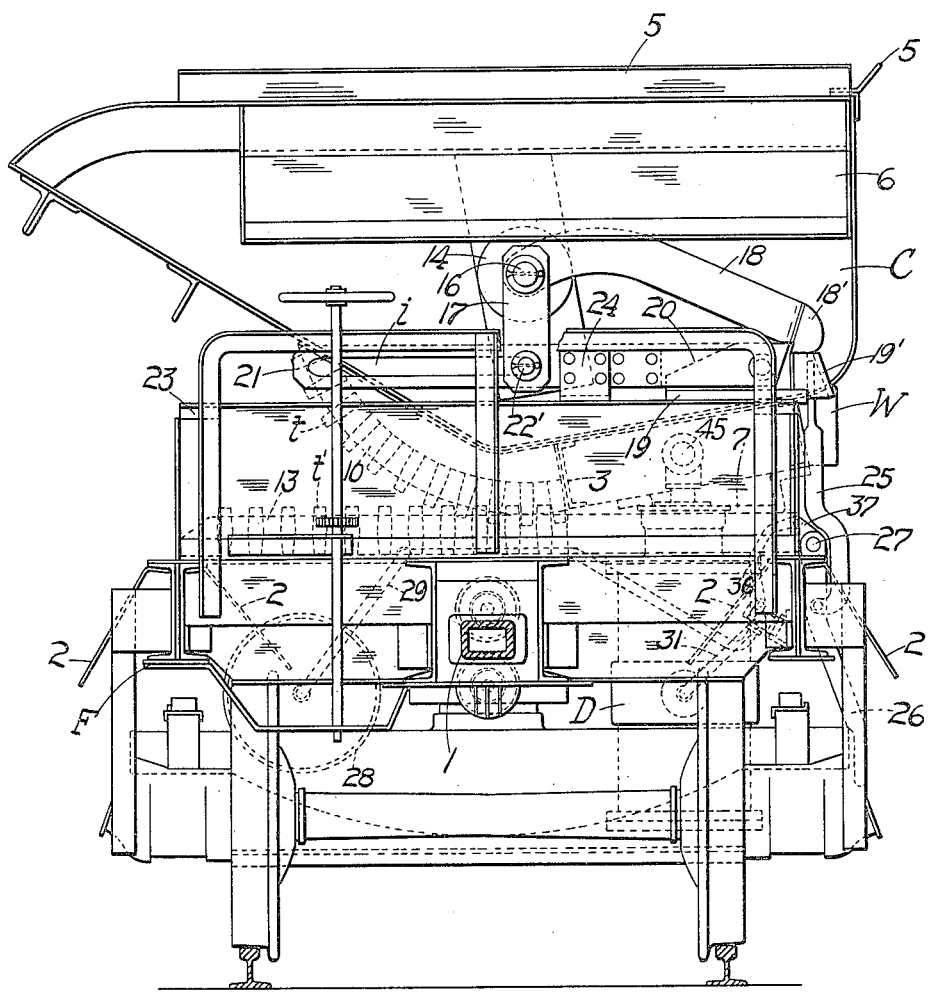

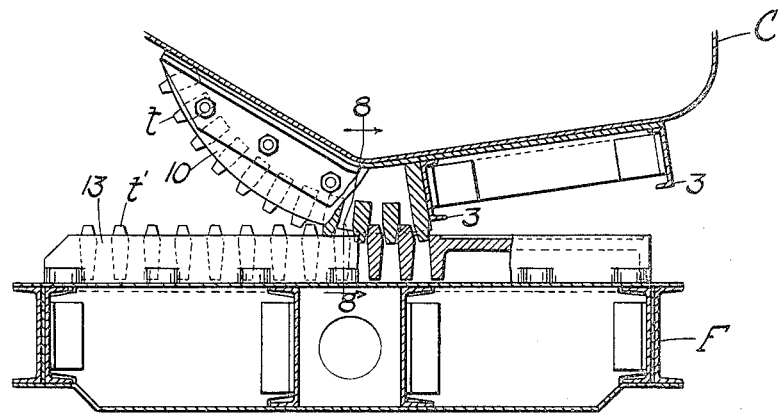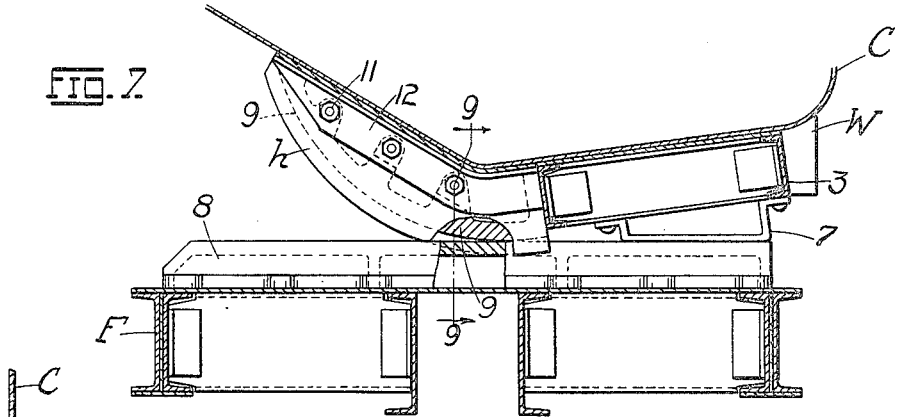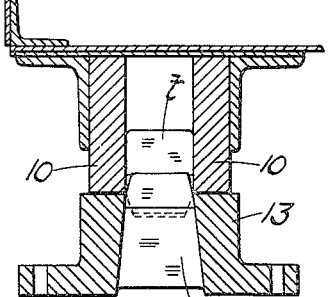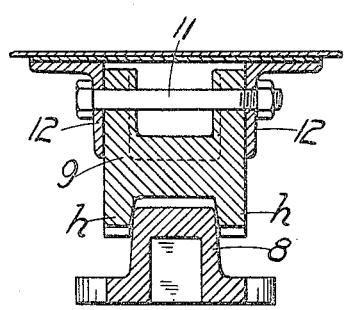

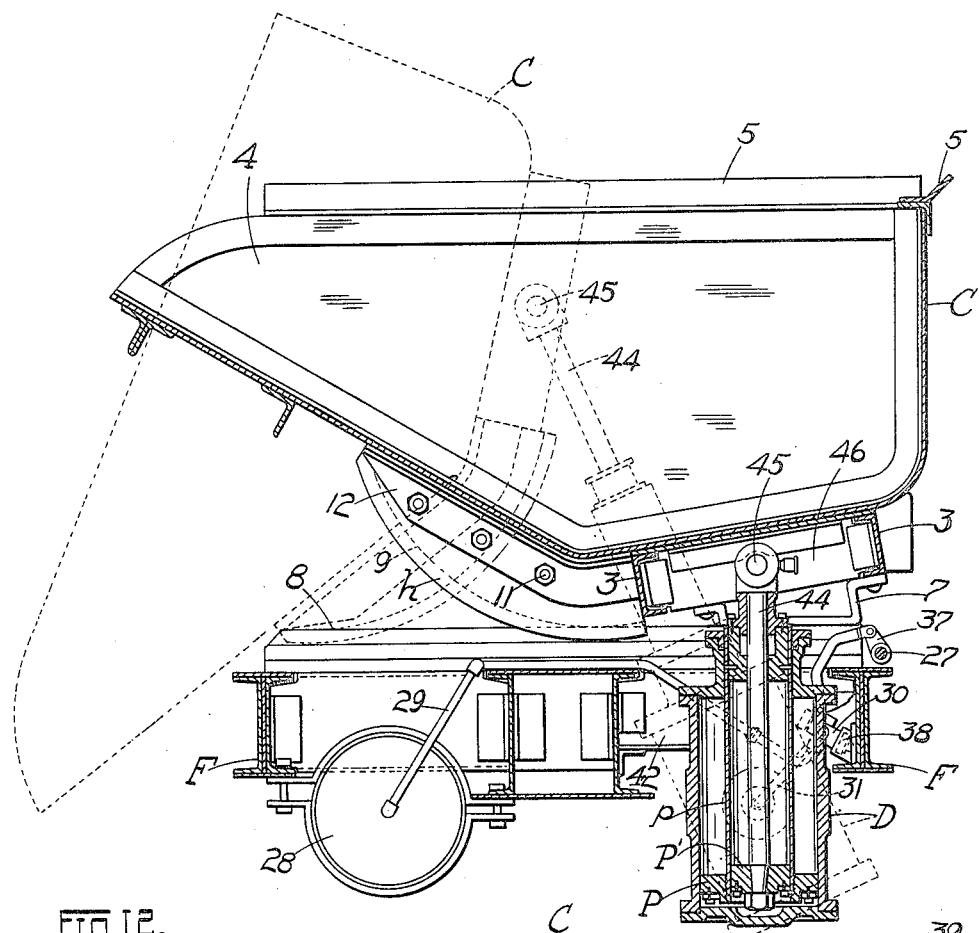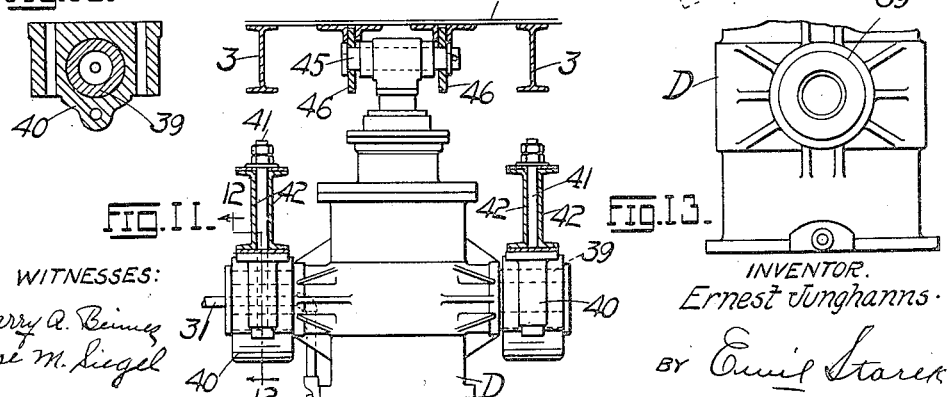

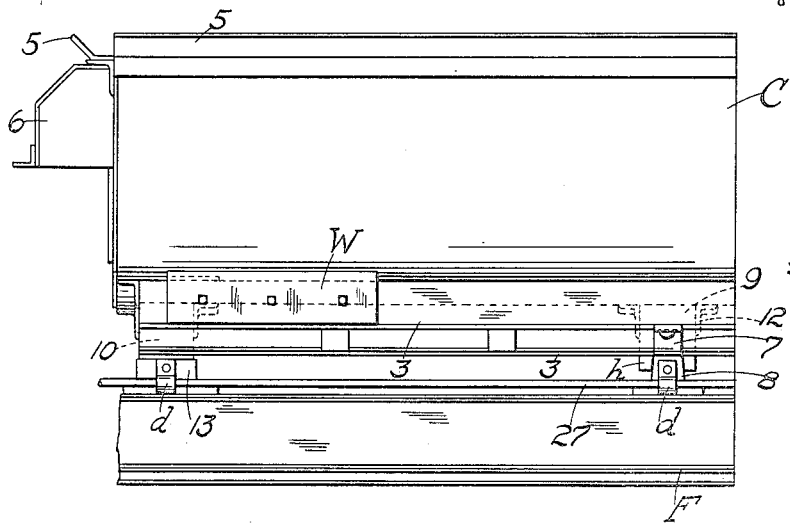
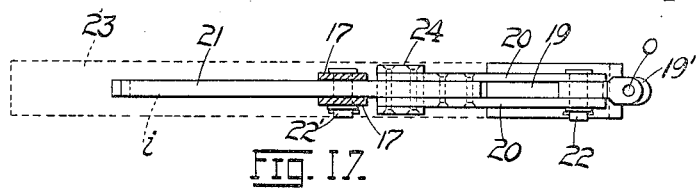
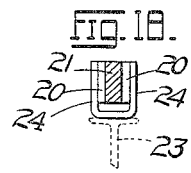
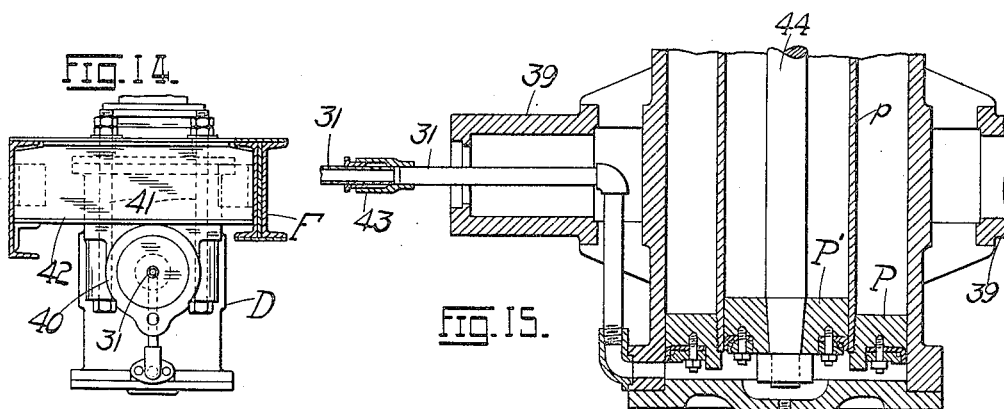
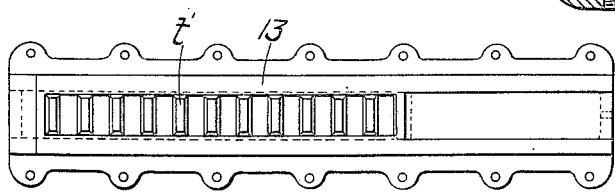

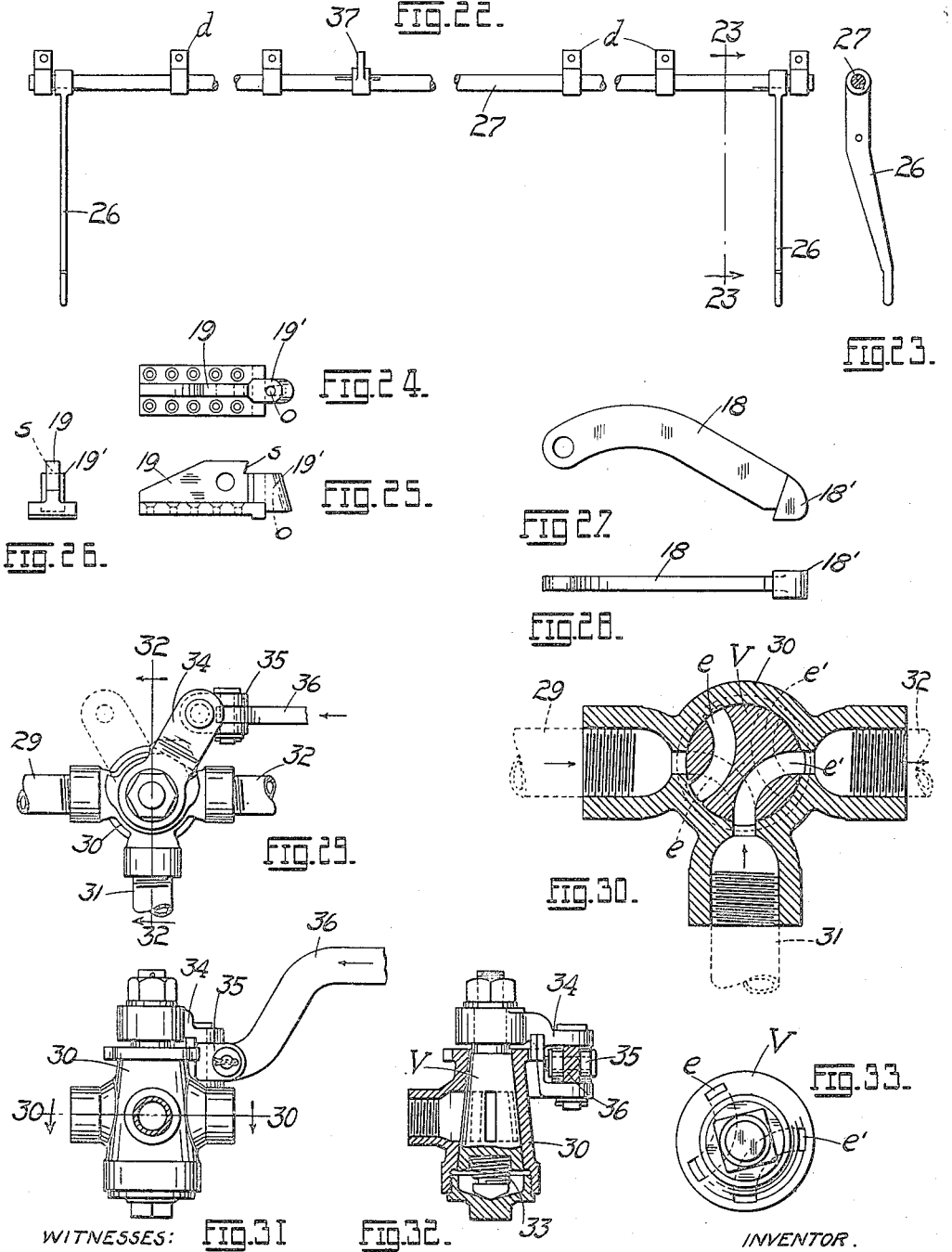

UNITED STATES PATENT OFFICE.

ERNEST JUNGHANNS, OF ANACONDA, MONTANA, ASSIGNOR OF ONE-FOURTH TO WALLACE N. TANNER AND ONE-FOURTH TO WILLIAM C. CAPRON, BOTH OF ANACONDA, MONTANA.

DUMP-CAR.

1,305,118.
Specification of Letters Patent.
Patented May 27, 1919.

Application filed March 4, 1918. Serial No. 220,247.

*To all whom it may concern:*

Be it known that I, ERNEST JUNGHANNS, a citizen of the United States, residing at Anaconda, in the county of Deerlodge and State of Montana, have invented certain new and useful Improvements in Dump-Cars, of which the following is a full, clear, and exact description, reference being had to the accompanying drawings, forming a part hereof.

The present invention has relation to improvements in dump cars, the particular type to which the same is specially directed being the side dump, the car in the present embodiment of my invention dumping from one side only, and constituting what is known as a single side dump car. The objects sought by my invention are to provide a car of the character referred to which will have a large capacity and handle a maximum quantity of material; one which is leak proof and water tight and thereby capable of handling wet and fine material such as wet granulated slag, wet sand and the like; one which dumps from a comparatively high position so as to throw the material well away from the tracks; one which is simple in design and containing a minimum number of parts, thereby reducing not only the initial cost of construction but reducing the cost of repairs and upkeep; one in which the dumping apparatus is easily operated, the agent herein employed being preferably compressed air for which an air line is provided in addition to the usual air-brake line with which the cars in this instance are equipped, the air dumping charging line being supplied with air from an extra air pump and extra air reservoir on the locomotive; one in which the center of gravity of the dumping member or car body shall be so disposed relative to the common turning axis of the rolling segments on which it rocks as to cause the car body after emptying to return to its loading position by its own weight; one in which the center of gravity of the dumping car body or box (and its load) is a suitable distance back or rearward of the turning axis of the rolling supporting segments so that the car body under these conditions will have no tendency to dump by the influence of the load; one in which the pushing point of the car is directly under the center of gravity of the dumping body and its load; one which remains securely locked under ordinary transportation conditions; one which locks automatically when returned to loading or resting position; one which is readily released from its locked position preparatory to dumping; and one possessing further and other advantages better apparent from the following detailed description in connection with the accompanying drawings in which—

Figure 1 represents a top plan of the improved car, with one-half of the dumping car body removed to expose the corresponding portion of the car frame or supporting platform and parts carried thereby; Fig. 2 is a side elevation of the car looking toward the dumping side of the car body; Fig. 3 is an enlarged side elevation of one end of the car looking toward the dumping side of the car body; Fig. 4 is a longitudinal sectional detail on the line 4—4 of Fig. 3 showing the butt strap joint between the plates of which the car body is constructed; Fig. 5 is an end elevation of the car with dumping car body in resting position; Fig. 6 is a vertical cross-section through the car frame and dumping car body on the zig-zag line 6—6 of Fig. 3; Fig. 7 is a vertical cross-section through the car frame and dumping car body on the zig-zag line 7—7 of Fig. 3; Fig. 8 is an enlarged vertical transverse section through the toothed rocker segment and its rail on the zig-zag line 8—8 of Fig. 6; Fig. 9 is an enlarged vertical transverse section through the smooth rocker segment and its rail, on the zig-zag line 9—9 of Fig. 7; Fig. 10 is a vertical cross-section through the car frame and dumping car body, the plane of section passing through the middle of the air cylinder by which the car body is dumped; Fig. 11 is a face elevation of the air cylinder showing the supporting bearings therefor and the pivotal connection of the piston rod of the inner piston thereof with the bottom of the dumping car body, certain parts being in section; Fig. 12 is a vertical transverse sectional detail on the line 12—12 of Fig. 11; Fig. 13 is an enlarged side elevation of the lower half of the air cylinder showing the hollow trunnion thereof; Fig. 14 is a side view of the air cylinder showing the manner of securing the trunnion bearings to the car frame; Fig. 15 is an enlarged longitudinal middle section of the lower portion of the air cylinder, the plane of section passing through the trunnions of the cylinder; Fig. 16 is an elevation of one-half of the car looking toward the rear side or that opposite to the dumping side of the car body; Fig. 17 is a horizontal sectional detail on the line 17—17 of Fig. 20 showing the oscillating bar hinged to the keeper or bracket engaged by the locking latch; Fig. 18 is a vertical cross-sectional detail on the line 18—18 of Fig. 20; Fig. 19 is a top plan of one of the toothed rails which supports the toothed rocker segment; Fig. 20 is a side elevation of the locking mechanism or a view looking toward the end of the car, and showing also an end view of the rock-shaft and side view of operating lever, and connections leading from the rock-shaft to the valve controlling the air to the air cylinder, the dumping car body being shown in mere outline to avoid obscuring the remaining parts; Fig. 21 is a rear view of the mechanism shown in Fig. 20, and showing also a portion of the car-body; Fig. 22 is a detached plan of the rock-shaft and operating levers and small lever on the rock-shaft to which are coupled the valve-operating links shown in Fig. 20; Fig. 23 is a vertical cross-sectional detail on the line 23—23 of Fig. 22; Fig. 24 is a plan of the bracket operating as a keeper for the gravity latch of the locking mechanism; Fig. 25 is a side elevation thereof; Fig. 26 is a front end view thereof; Fig. 27 is a side elevation of the gravity latch; Fig. 28 is a bottom plan of the latch; Fig. 29 is an end view of the three-way valve controlling admission of the motor fluid to the dumping air cylinder; Fig. 30 is an enlarged middle cross-section of the valve on the line 30—30 of Fig. 31; Fig. 31 is an elevation of the valve; Fig. 32 is a longitudinal section of the valve on the line 32—32 of Fig. 29 with parts in elevation; and Fig. 33 is an end view of the rotary member or valve plug removed from its casing.

Referring to the drawings, F represents the car frame or platform, the same being provided with standard car couplers 1 and usual draft gear and with standard Westinghouse freight car air brake equipment (not shown) well understood in the art. The frame is otherwise mechanically assembled to resist strains and made sufficiently strong to carry the dumping load, and is supported on standard railroad car trucks T as shown. The car frame is herein shown more or less conventionally, no attempt being made to go into details of construction as these are within the purview of the skilled mechanic and are not involved in the immediate improvements to which the present invention is particularly directed.

In the present instance the car frame is provided with special aprons or protector plates 2 over the axle boxes to keep out any material spilled in loading.

In the present embodiment of my invention the dumping car body C is in the form of an oblong box extended longitudinally of the car frame from platform to platform, the said box being made of steel plates with butt strap joints $a$ heavily riveted and countersunk on the dumping side (rivets not shown) and made water tight by calking. The car body is reinforced by conventional structural members 3, and stiffened by a central cross partition 4, and provided on top with shedding plates 5, 5, at the ends and operating side, the ends of the box being provided with steel boxes or hoods 6 to protect the locking mechanism presently to be described. The cross-section of the dumping car body or box is substantially U-shaped with the front wall however disposed at an angle or incline to the rear wall, the latter being substantially vertical when the car body is in resting position. When in said resting (or loading) position the rear of the car rests on castings or shoes 7 secured to the car body, the said shoes being in turn supported by the rear ends of the intermediate rocker supporting cross rails 8 to be presently referred to. Under my invention the dumping movement imparted to the car body is a rocking movement whereby the body is caused to advance sidewise and dump the material well away from the tracks. As herein constructed, the car body is provided with two sets of specially designed demountable rocker segments 9 and 10 respectively, whose peripheries follow the arcs of circles, the combined action of these segments and their coöperating supporting rails being to take up end thrusts due to stopping and starting of the car (or train) and thus prevent the car body from sliding endwise, and to insure true rolling contact on the pitch line and prevent slipping in the general dumping or rolling plane of the car body. The first set of segments 9 constitutes the intermediate or middle set, the segments 10 being the outer set and disposed at or near the ends of the car body. The several segments are fastened to the dump body or car C by bolts 11 bolting tight between angles 12, 12, disposed along the inclined bottom or wall of the car body, or in any other suitable mechanical manner. The segments 9 rock or roll on the rails 8 above mentioned, said rails being disposed transversely across the frame F, and bolted or otherwise secured thereto in any suitable mechanical manner. The treads of the rails 8 are confined between the side flanges $h$, $h$, of the segments 9, said flanges engaging the opposite sides of the rail whereby the same take up longitudinal or end thrusts due to the stopping and starting of the car or train. In the present embodiment of my invention each segment 9 is double flanged, but a single flange for each segment (9) to take up the longitudinal or end thrust would not fall outside the spirit of my invention. The segments 10 on the other hand are toothed, each segment having curved sides or rocker sections connected by the teeth $t$, said sides rolling or rocking on the corresponding side portions of the toothed or rack rails 13 disposed across the frame F and bolted or otherwise secured thereto. The side portions of the rails 13 are connected by teeth $t'$ which mesh with the teeth $t$ of the rockers or segments 10, said toothed or geared rails being used in the main for insuring true rolling contact on the pitch line and prevent slipping (in the rocking plane) between the dumping body C and its supporting frame F. While the teeth $t$, $t'$, may in a measure take up end thrusts, the main strain comes on the flanges $h$, $h$, of the segments 9, and the rails 8. The several rails and their rocker segments may have other constructions from that shown without involving a departure from the nature or spirit of my invention. In the present instance the spaces between the teeth $t'$ of the rack-rails 13 are open at the bottom so as to allow dirt and sand to fall out; and while this is the preferred construction, yet one less desirable is not to be considered as a departure from my invention. Again, in the present example I double flange the rocker 9, but it is apparent that I may double flange the rail 8 and allow the tread of the rocker to roll over the tread of the rail between the flanges, a construction which though just the reverse of that here shown would nevertheless come within the spirit of my invention. It may be stated in passing that the dumping car body is so weighted or constructed as to maintain the center of gravity thereof below the common turning or rolling axis of the segments 9, 10, (the segments have their center points on a common axis), whereby the car after emptying will return to loading position by its own weight. In the present example suitable weights W are disposed at the ends of the car body in the rear thereof, although any equivalent manner of weighting the car body may be resorted to. Again, the center of gravity of the dumping car body after loading is a small distance back or rearward of the aforesaid turning or rolling axis of the segments so the car under these conditions will have no tendency to dump or pitch forward by the influence of the load. This is of special importance when the cars are in motion, the low center of gravity of the load and its position behind the turning axis of the segments insuring stability for the car bodies.

The car body when in resting position should be securely locked. In the present embodiment of my invention the locking mechanism is disposed at opposite ends of the car, being under the control of the operator from a point on the rear side of the car as will appear from the following detailed description of said mechanism. At each end of the dumping car body beneath the hood 6 is secured a disk 14 with a spacing hub 15 through which passes a pin or stud 16 from the outer end of which depend a pair of hanger links 17, 17, between which there is hinged about the stud a gravity latch or lock bar 18 the free end of which is provided with a knife-edged head 18' for engagement with the locking shoulder $s$ of a bracket or keeper 19 carried by the frame F. The keeper is spanned by the fork terminals 20, 20, of the longitudinally slotted bar 21, said fork terminals being pivotally coupled to the keeper by a pin 22 whereby the bar is free to oscillate in a transverse plane parallel to the general rocking plane of the car body C. The slot $i$ of the bar 21 is freely traversable by a pin 22' connecting the lower ends of the links 17, 17, between which the bar is confined. The bar 21 is normally maintained in a horizontal position and spaced from the structural member or I-beam 23 supporting the same by a U-shaped strap 24 embracing the terminals 20, 20, and bar 21 at their point of assembly (Figs. 17, 20). I do not of course wish to be restricted to these details, any other equivalent construction falling within the scope of my invention. The parts when locked appear as shown in Figs. 5, 20 and 21. To unlock the latch the same must necessarily be disengaged from the locking shoulders $s$ of the keeper 19. In the present embodiment of my invention the keeper 19 is provided with a terminal extension or nose 19' beyond the shoulder $s$, said nose being provided with an upwardly tapering passage-way or opening $o$ through which may be projected the reduced upper end of a bent push rod 25 normally resting in said passage-way, the lower end of the push rod being hinged to a hand lever 26 keyed or otherwise secured at its fixed end to a longitudinally extended rock-shaft 27 mounted below the car body C on the side opposite to the dumping side of the car, said shaft being supported by brackets $d$ disposed along the (rear) side of the supporting platform or frame F as shown. By seizing the lever 26 (at either end of the rock-shaft) and raising the same sufficiently, not only will the shaft 27 be rocked, but the push rod 25 will be lifted and its free end projected through the nose 19' far enough to trip and disengage the latch 18 from its keeper, leaving the free end or head 18' of the latch free to ride on the upper edges of the members 20, 20, and 21. The latch 18 being thus released leaves the car body C free to be dumped or rocked to dumping position as shown by the dotted illustration in Fig. 20.

When the car body is in dumping position the links 17, 17, and bar 21 assume a straight line, the links being pulled to the outer limit of the slot $i$, the latch 18 being pulled with the links, the free end of the latch resting at a point about the middle of the full length of the members 20 and 21. The links 17 and bar 21 being thus pulled out or extended their full length, arrest the further rocking or tilting of the car body, thereby necessarily limiting the distance of travel for the center pin (16) of the segments 9, 10, and holding the dumping body securely at both ends in its extreme dumping position, whereby the geared engagement of the outside rails 13 with the segments 10 will prevent the segments from slipping on their supports. It may be stated in passing that the turning axis of the segments 9, 10, is substantially coincident with the axis of the pins 16, the horizontal advance of which determines the advance of the turning axis of the car body involved in the rolling or rocking movement necessary to be imparted to the car body to effectively dump the same. The car body after being dumped will by its own weight return to resting position (as previously pointed out), the gravity latches 18 automatically dropping back into engagement with the shoulders $s$ of their keepers 19, so that the car body will lock itself automatically. Necessarily, the disengagement of the latches 18 from their keepers or the release of the car body from its locked position must be effected before the dumping operation can begin. In the present embodiment of my invention the rocking of the shaft 27 involved in the tripping movement of the push rods 25 (the movement necessary to release the latches 18) sets in motion the instrumentalities by which the dumping of the car body is effected, once the latches are released from locking position. In the present construction the dumping is effected pneumatically or by means of an air-operated piston to the cylinder of which compressed air is admitted from the storage tank of a special air line, through the means of a suitable valve, actuated at the proper moment by the rocking of the shaft 27 with a swing of the hand lever 26 past the point necessary to effect disengagement of the locking latches from their keepers. The dumping mechanism is substantially as follows:

Disposed longitudinally of the train or car is an air dumping line L receiving its air supply from a special reservoir on the engine or locomotive, said air line discharging the air into a dumping air reservoir 28 mounted on the bottom of the car frame F preferably near the middle of the length of the car. The reservoir 28 is tapped by a pipe 29 which discharges into the valve-casing 30 of a conical three-way valve V the ports $e$, $e'$, of which may be made to establish communication between the pipe 29 and pipe 31 leading to the dumping air cylinder D, and between the pipe 31 and exhaust 32 respectively, depending on the degree of rotation imparted to the valve. The valve is seated by a spring 33 engaging the base thereof, the opposite end of the valve being provided with an offset forked jaw link 34 to which is pivotally secured a short forked link 35 having pivotally coupled thereto the lower end of a bent connecting rod 36 whose upper end is pivotally coupled to the oscillating end of a small lever 37 secured to the rock-shaft 27 at a point opposite the valve casing 30 and oscillating substantially parallel to the plane of oscillation of the dumping car body. The valve casing is preferably carried by a bracket or socket 38 secured to one of the structural members entering into the construction of the car frame F (Fig. 20). The dumping air cylinder is mounted to rotate in a vertical plane about a transverse horizontal axis, the said cylinder being provided with hollow trunnions 39 supported in hangers or bearings 40 which are secured by bolts 41 to the structural members 42 of the car frame F. The air pipe 31 passes through the center of one of the trunnions, then emerges from the trunnion and is bent parallel to the cylinder wall which it finally taps at the lower or air intake end, the compressed air being delivered to the cylinder behind the piston. To allow for rotation of the cylinder a swivel joint 43 is provided for the pipe 31 at a point adjacent to and just outside the trunnion. In the present embodiment of my invention the cylinder is provided with a double piston of telescopic design, the larger or outside piston P and its hollow piston rod $p$ acting at the beginning of the stroke; and when the limit of said stroke is reached, the smaller or inside piston P' and its push or piston rod 44 begin to act, the combined stroke of the two pistons and their piston rods being of the proper length to impose on the dumping car body the necessary rocking movement to tilt the body to dumping position. The upper end of the piston rod 44 of the smaller piston is pivotally connected to the dumping car body C by means of a pin 45 carried by plates 46, 46, secured to the bottom of the car body in any approved mechanical manner. The pushing point of the rod 44 is substantially directly under the center of gravity of the car body and its load, the cylinder D being located underneath the car body and midway between the opposite ends thereof. The cylinder being mounted to rotate in the rolling plane of the car body can readily follow the point of attachment of the piston rod 44 therewith, allowing the piston rods $p$ and 44 to assume the variable inclined positions to which they are brought by the dumping movement of the car body.

The cylinder being free to rotate allows the piston rods to move along the cylinder axis, so that no lateral strain is suffered by said rods in either stroke. Ordinarily a pressure of ninety pounds is sufficient to move the pistons and dump the car, though a higher pressure may be availed of. The air in front of the pistons serves as a cushion on the driving or upstroke (the cylinder is single acting) of the pistons so that a cushioning effect is exerted on the dumping body.

From the connections above described it will be observed that with the rotation of the rock-shaft 27 not only will the push rods 25 be actuated to trip and disengage the latches 18, but at the same time will rotation be imparted to the valve plug V in proper direction to release the air from the reservoir 28 to the pipe 31 and into the air cylinder D, and close the pipe 31 to the exhaust 32. It is of course necessary to trip or release the latches before the air shall assert itself in the cylinder to operate the pistons. Accordingly, the valve V is made with sufficient overlap (Fig. 30) to allow for the necessary rotation of the rock-shaft to effect a release of the locking latches without allowing the air to pass into the pipe 31 and air cylinder D. In this initial rotation the valve may turn sufficiently to close the exhaust 32 without exposing the port $e$ to the discharge end of the pipe 29, or establishing communication between the pipes 29 and 31. At any rate the valve is so constructed that no air is admitted into the cylinder until after the latches 18 have been disengaged from their keepers. Air once admitted to the cylinder D, drives the pistons before it, the piston rod 44 pushing the car body and causing it to roll on the segments 9, 10, to dumping position. As long as the pressure is behind the pistons the car body may be held in its dumping position. By rocking the shaft 27 in the opposite direction, that is, by depressing the levers 26 and rotating the valve V to its exhausting position (Fig. 30) the air behind the pistons will now exhaust from the cylinder through the pipe 31, port $e'$, and pipe 32 into the atmosphere, thus releasing the car body C which settles by its own weight to resting position. In thus returning to resting position the pistons and piston rods collapse, and the members 17, 21, 20, and 18 return to their normal positions, the heads 18' of the latches 18 automatically dropping into locking engagement with the shoulders $s$ of the keepers 19. The car body is now in readiness to be refilled and again dumped. As well understood in the art, a check valve 45' is interposed between the dumping air line L and the reservoir 28. Features shown but not alluded to, and others not shown though necessary to the running of any railroad car, are well understood in the art, form no part of the present invention, and hence a description thereof is neither necessary nor desirable. In the present example the cars are shown hand operated, that is to say, each single car is hand operated; but I do not wish to be restricted to this arrangement as it is apparent that other modes of operating the cars could be resorted to without involving a departure from the nature or spirit of the invention. I do not wish to be restricted to the use of compressed air for driving the piston by which the car is rocked and dumped, any other motor fluid or other forms of actuating apparatus falling within the spirit of my invention. Neither am I to be understood as restricting the mechanism herein described specifically to "side" dumping cars, or to rocking cars.

Having described my invention, what I claim is:

1. In a side-dump-car, a dumping car-body, rocker members supporting the same and having their turning axis disposed forward of the center of gravity of the car-body, means for holding said members against displacement in a direction transverse to the planes of the rocking movements, and means for imparting to the car-body a rocking movement to dump the same.

2. In a side dump-car, a dumping car-body having a substantially vertical rear wall and a front outwardly and upwardly inclined wall over which the material is discharged, one or more circular rocker segments supporting the car-body and permitting the same to be rocked for dumping in the direction of the inclined wall, the turning axis of the segments being disposed to one side of the center of gravity, and toward the side of the inclined wall of the car-body, supporting rails for said segments, and suitable coacting formations between the segments and rails for preventing displacement of the car-body in a direction transverse to the rocking movements of the segments.

3. In a side dump-car, a dumping car-body, a plurality of curved rocker segments for rocking the car-body, the turning axis of the segments being disposed to one side of the center of gravity of the car-body and toward the front or dumping side thereof, supporting means for said segments, suitable formations between a portion of the segments and supporting means for insuring a positive rolling contact and preventing slipping of the car-body in the rocking planes of the segments, and suitable formations between another portion of the segments and supporting means for preventing displacement of the car-body in a direction transverse to the rocking planes of the several segments.

4. In a side dump-car, a dumping car body provided with curved rocker segments, means for rocking the said body in a given direction to dump the same, and devices at the ends of the car body leading from the turning axis of the segments for locking the car-body in resting position.

5. In a side dump-car, a dumping car body provided with curved rocker segments, devices at the ends of the car body leading from the turning axis of the segments for locking the car-body in a resting position, and means for releasing said locking devices and simultaneously imparting to the car body a rocking movement on its rocker segments for dumping the car.

6. In a side dump-car, a dumping car body provided with curved rocker segments, devices at the ends of the car body leading from the turning axis of the segments for locking the car-body in resting position, mechanism for rocking the car body in a given direction to dump the same, and devices under the control of the operator for setting said mechanism into operation and simultaneously releasing the locking devices aforesaid.

7. In a side dump-car, a dumping car body provided with rocker segments, locking devices at the ends of the car body leading from the turning axis of the segments for holding the car-body in resting position, a cylinder rotatable about a transverse axis in a plane parallel to the rocking plane of the car body, a piston operating in said cylinder and pivotally coupled to the car body, and means under the control of the operator for admitting suitable motor fluid into the cylinder for actuating the piston and dumping the car, and simultaneously releasing the locking devices, the latter automatically returning to locking engagement with the return of the car body to resting position.

8. In a side dump-car, a dumping car body, circular rocker segments on the bottom of the car-body for supporting the same and having a common turning axis in the car body, the center of gravity of the car body being normally below and rearward of the turning axis of the segments, means in the rear of the car body engaging the same below the center of gravity of the body for pushing the body and causing the same to rock to dumping position, the car body returning by its own weight to resting position on the discontinuance of the pushing action aforesaid.

9. In a side dump-car, a car body, rockers on the bottom of the car-body, actuating means rearward of the car body for rocking the body forward for the purpose of dumping, the center of gravity of the body being rearward of the turning axis of the rockers whereby upon discontinuance of the actuating means and the return of the body to resting position, the tendency to dump by the influence of the load will be eliminated.

10. In a dump-car, a rocking car body, latches at the car ends for holding the car-body locked in resting position, a fluid-operated piston for actuating the car body in a given direction for purposes of dumping, a cylinder for the piston, a source of motor fluid supply, a valve controlling the admission of the motor fluid to the cylinder, means for actuating the valve and devices controlled by said actuating means for releasing the latches in advance of the admission of the motor fluid into the cylinder.

11. In a dump-car, a car body mounted to oscillate or tilt in a given plane about a horizontal axis, a cylinder mounted below the center of gravity of the car body and free to rotate about a transverse axis in a plane parallel to the plane of oscillation of the car body, a fluid-operated piston in the cylinder, a push rod leading from the piston through one end of the cylinder and engaging the car body at a suitable point to impart thereto the necessary degree of oscillation to dump the same with an outward thrust of the rod, a source of motor fluid supply, a controlling valve for the fluid interposed between said supply source and the cylinder and operating to admit the motor fluid to said cylinder, locking devices at the car ends for holding the car body in resting position, means for actuating the valve, and devices controlled by said actuating means for disengaging the locking devices from the car body in advance of the admission of the motor fluid to the cylinder to operate the piston and the push rod leading therefrom.

12. In a dump-car, a car body oscillating about a given axis, means for tilting the body to dumping position, a fixed support for said body, and suitable links interposed between said support and body for limiting the degree of oscillation of the body when dumping.

13. In a dump-car, a car body oscillating about a horizontal axis, a support for the car body, locking latches at the ends of the car body, keepers for said latches on the support, a cylinder, a piston therefor, a piston rod leading from the piston and engaging the car body to push the same to dumping position, a rock-shaft, means for actuating the shaft, a source of motor fluid supply, a rock-valve interposed between said source and the cylinder, for controlling the flow of the motor fluid from the supply source of the cylinder, means controlled by the rock-shaft for actuating the valve, and means interposed between the rock-shaft and latches for disengaging the latter from their keepers in advance of sufficient movement of the valve to admit the motor fluid to the cylinder.

14. In a dump car, a dumping car body, rocker segments for the same, means for rocking the body about the turning axis of the segments in a given direction to dump the same, a suitable platform or support for the segments, a gravity locking latch hinged at one end of the car body, a keeper on the platform disposed on the side from which the car rocks in the operation of dumping, a longitudinally slotted bar hinged to the keeper and oscillating in a plane parallel to the rocking plane of the car body, links suspended from the hinge axis of the latch, means on the lower ends of the links traversing the slot of the bar and coupling said bar to the links, a push-rod traversing the keeper, and positioned to engage the latch and trip the same out of engagement with the keeper, and means under the control of the operator for actuating the push rod and disengaging the latch and leaving the car body free to be dumped.

15. In a dump-car, a dumping car body, a support for the same, a latch at either end of the car-body for holding the body locked in resting position, a keeper for the latch, a motor fluid-operated piston for actuating the body to bring the same to dumping position, and means under the control of the operator for releasing the latch and at the same time causing the piston to respond to the pressure of the motor fluid for dumping the car body.

16. In a dump-car, a dumping car body, a support therefor, a motor-fluid operated piston for actuating the body to bring the same to dumping position, a cylinder for the piston, a source of motor fluid supply, a valve for establishing communication between said supply source and cylinder, a latch carried by the car body, a keeper for the latch, a rock-shaft, intermediate connections between the rock-shaft and latch and valve respectively for releasing the latch from the keeper and operating the valve to cause the motor fluid to flow into the cylinder behind the piston and bring the car body to dumping position.

In testimony whereof I affix my signature, in presence of two witnesses.

ERNEST JUNGHANNS.

Witnesses:
  H. F. FORSYTH,
  A. J. KRUM.